US00RE40051E

(19) United States
(12) Reissued Patent
Stamey, Jr. et al.

(10) Patent Number: US RE40,051 E
(45) Date of Reissued Patent: Feb. 12, 2008

(54) ONE-PIECE SELF-VENTING DRAIN VALVE

(75) Inventors: Willie L. Stamey, Jr., Kings Mountain, NC (US); Mark A. Roll, Bessemer City, NC (US)

(73) Assignee: Wix Filtration Corp LLC, Gastonia, NC (US)

(21) Appl. No.: 10/803,197

(22) Filed: Mar. 18, 2004

Related U.S. Patent Documents

Reissue of:
(64) Patent No.: 6,565,746
Issued: May 20, 2003
Appl. No.: 10/134,693
Filed: Apr. 30, 2002

(51) Int. Cl.
*F16K 24/00* (2006.01)
*B01D 35/00* (2006.01)

(52) U.S. Cl. ..... 210/248; 210/313; 210/541; 137/588

(58) Field of Classification Search ..... 210/248, 210/313, 541; 137/588
See application file for complete search history.

(56) References Cited

U.S. PATENT DOCUMENTS 4,724,074 A * 2/1988 Schaupp ..... 210/163
4,893,651 A * 1/1990 Herman et al. ..... 137/588
4,922,960 A * 5/1990 Oelschlaegel ..... 137/588
5,144,978 A * 9/1992 Brown et al. ..... 137/588
5,922,199 A * 7/1999 Hodgkins ..... 210/256
6,083,381 A * 7/2000 Connelly et al. ..... 210/86
6,237,628 B1 * 5/2001 Miller et al. ..... 137/588
6,248,236 B1 * 6/2001 Hodgkins ..... 210/232
6,258,269 B1 * 7/2001 Knight ..... 210/248
6,358,416 B1 * 3/2002 Miller et al. ..... 210/248

FOREIGN PATENT DOCUMENTS

EP 1090667 * 4/2001

* cited by examiner

*Primary Examiner*—Thomas M. Lithgow
(74) *Attorney, Agent, or Firm*—Honigman Miller Schwartz Cohn LLP

(57) ABSTRACT

A self-venting drain valve is rotatably and slidably mounted to a filter assembly through an internally threaded base. The drain valve comprises a homogenously formed one-piece unitary valve body including a tubular valve stem portion and a valve knob portion. The valve stem portion includes a wall member defining an internal passageway provided with axially extending air vent openings through which ambient air can enter a filter housing through the internal passageway, and drain holes through which water is drained from the filter housing and the internal passageway. The air vent openings are formed through an upper portion of the wall member and are open to a top edge thereof, while the drain holes are formed through the lower portion of the wall member. The liquid drains from the filter housing through the internal passageway and the drain holes, then exits into the valve knob portion.

21 Claims, 6 Drawing Sheets

ONE-PIECE SELF-VENTING DRAIN VALVE

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to self-venting valves, and more particularly to a self-venting valve for draining water from fuel filter assemblies.

2. Description of the Prior Art

Self-venting liquid drain valves have been known in the art for many years. Specifically, various assemblies have been made to provide fluid drainage from a vessel while providing a separate inlet for gas, such as air, to replace the fluid being drained. For example, in fuel/water separators used in diesel engines, water must be periodically drained using a valve assembly adapted to feed air into a separator while the water is being drained. The prior art devices have accomplished this by providing separate air and liquid passages formed through a portion of the valve assembly member.

A problem that occurs with fluid filter assemblies, particularly useful for diesel engines and gasoline marine engines, is facilitating the removal of contaminants from the filter assembly. These contaminants include water and particulate matter that tend to settle at the bottom of housings used to retain filter elements. In order to remove the water and particulate matter suspended in the water, drain valves are frequently positioned at the bottom of housings used to retain filter elements. If a simple drain cock is utilized for the valve, the drainage may not be complete or may not occur at all because a partial vacuum is created in the filter housing upon initiating drainage. The partial vacuum prevents water from flowing through the open valve.

In order to facilitate drainage by breaking the partial vacuum, drainage valves in fuel filters are vented. It is necessary to close the vent hole when the valves are closed so that fluid within the fluid filter does not flow out through the vent hole. In prior art arrangements there is the possibility of vent holes becoming blocked by particulate debris suspended in the fuel or water at the bottom of the housing. This is because the end of the vent tube, which opens within the housing, is left continuously open so that over time particles can accumulate in the vent tube.

Furthermore, currently used drain valves are made of multiple parts that makes them expensive in manufacturing and laborious and difficult to assemble.

SUMMARY OF THE INVENTION

The present invention provides a new and improved self-venting drain valve for filter assemblies and the like, which self-venting valve is reliable and is configured for ease of assembly and operation. The self-venting drain valve is provided for selectively permitting and preventing draining of contaminant liquid, such as water, from a housing of the filter assembly, such as a fuel filter assembly.

The self-venting drain valve in accordance with the preferred embodiment of the present invention includes a one-piece unitary valve body slidably received within a valve retaining bore in the filter housing between a closed position preventing draining of contaminant liquid and an open position permitting draining of contaminant liquid. The homogenously formed one-piece unitary valve body comprises a valve stem portion positioned in the valve receiving bore within the filter housing, and a valve knob portion disposed at a lower portion of the valve stem portion and positioned outside the filter housing.

The valve stem portion includes a substantially tubular wall member defining an internal passageway provided with at least one drain hole through which water is drained from the filter housing and the internal passageway, at least one cantilever snap arm formed in an upper end of the tubular wall member and at least one air vent opening therethrough defined by an axially extending space provided between the tubular wall member and the snap arm and through which ambient air can enter a filter housing through the internal passageway. Both the drain hole and the air vent opening are adapted to fluidly communicate the internal passageway to an ambient air.

The air vent opening is formed through an upper end of the wall member and is open to a top edge thereof, while the drain hole is formed through the lower portion of the wall member. Thus, the entry of air into the housing of the filter assembly as allowed by the air vent openings is above the drain holes in order to facilitate drainage of the filter housing as proper siphoning of water has been found to be assisted. It has been also found that the drain holes of the water outlet should open slightly before the air vent openings of the air inlet opens to provide the proper flow sequencing. This function is achieved by locating the air vent openings well above the drain holes into the wall member of the valve stem portion.

Preferably, the valve body comprises two opposite drain holes and two opposite cantilever snap arms and, respectively, two opposite air vent openings.

Moreover, the lower portion of the wall member is provided with external threads which threadedly mate and are received within the internally threaded base of the filter housing. The external threads engage the internally threaded base when the drain valve is in the closed position. When the drain valve is in the open position, the snap arms formed at the upper end of the wall member engages the threaded base of the filter housing to secure open the drain valve.

The valve knob portion is adapted to facilitate manual operation of the drain valve and to assist in draining water from the filter housing. The valve knob portion includes a substantially annular groove facing the valve stem portion and defining a drain reservoir, and a drain spout forming a drain passageway through which the water drains. The liquid drains from the filter housing through the internal passageway and the drain holes, then into the drain reservoir in the valve knob portion, and exits the valve through the drain spout.

Preferably, the valve body of the self-venting drain valve including the tubular stem portion and the knob portion is homogenously formed as a one-piece unitary member and is made of a plastic material by an injection molding process.

Therefore, the one-piece self-venting drain valve in accordance with the present invention provides a simple self-venting liquid drain valve permitting liquid such as water to drain while gas such as ambient air enters the vessel being drained to facilitate drainage, even when the filter housing is subjected to a vacuum. The self-venting drain valve of the present invention is relatively simple and inexpensive to manufacture because of the simplicity of its design that is a significant improvement over prior art valves.

Upon further study of the specification and appended claims, further features and advantages of this invention will become apparent to those skilled in the art.

BRIEF DESCRIPTION OF THE DRAWINGS

Other objects and advantages of the invention will become apparent from a study of the following specification when viewed in light of the accompanying drawings, wherein.

DETAILED DESCRIPTION OF PREFERRED EMBODIMENTS

The preferred embodiment of the present invention will now be described with the reference to accompanying drawings.

Figure 1:
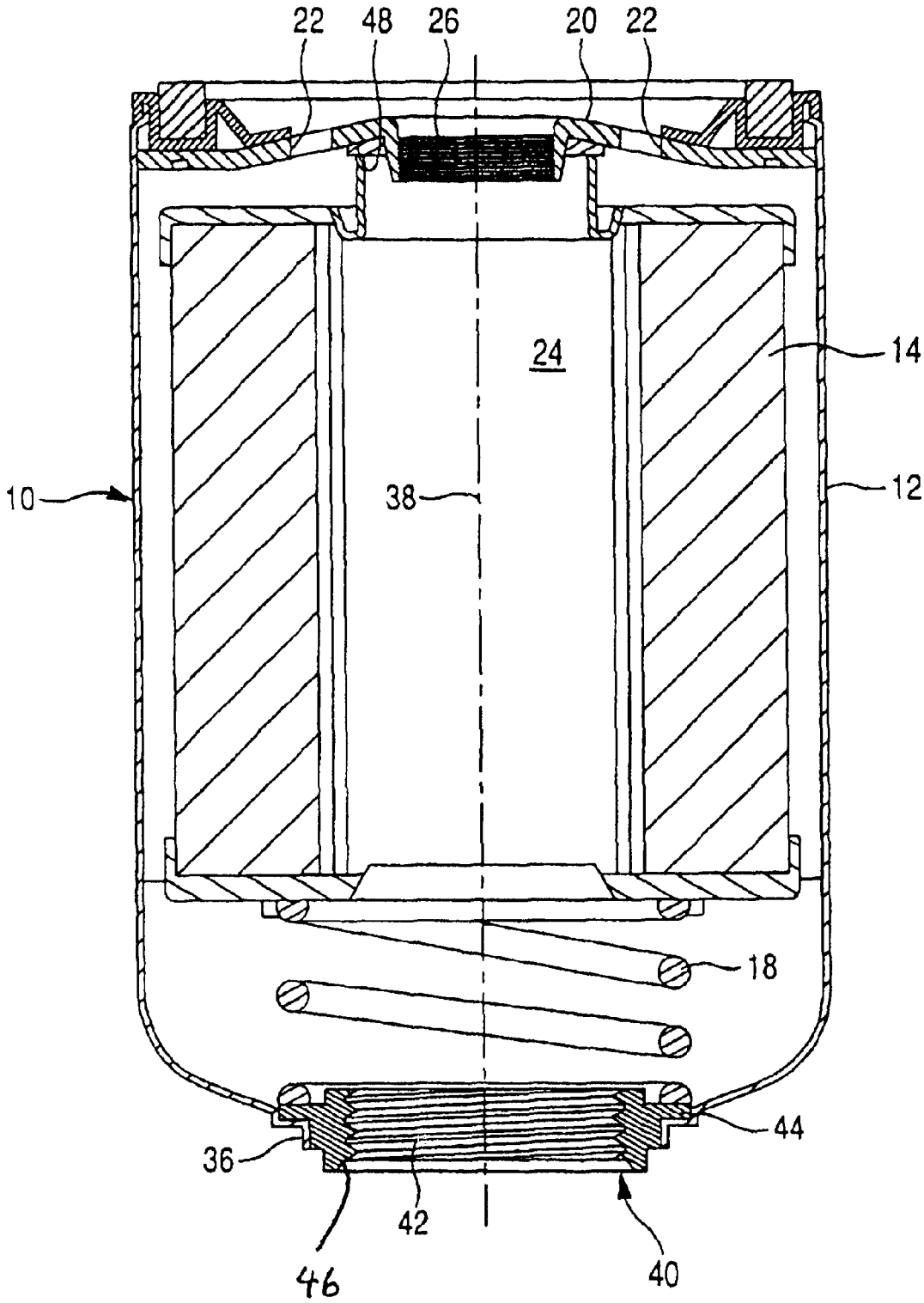
FIG. 1 is a cross-sectional view of a filter assembly.
Figure 2:
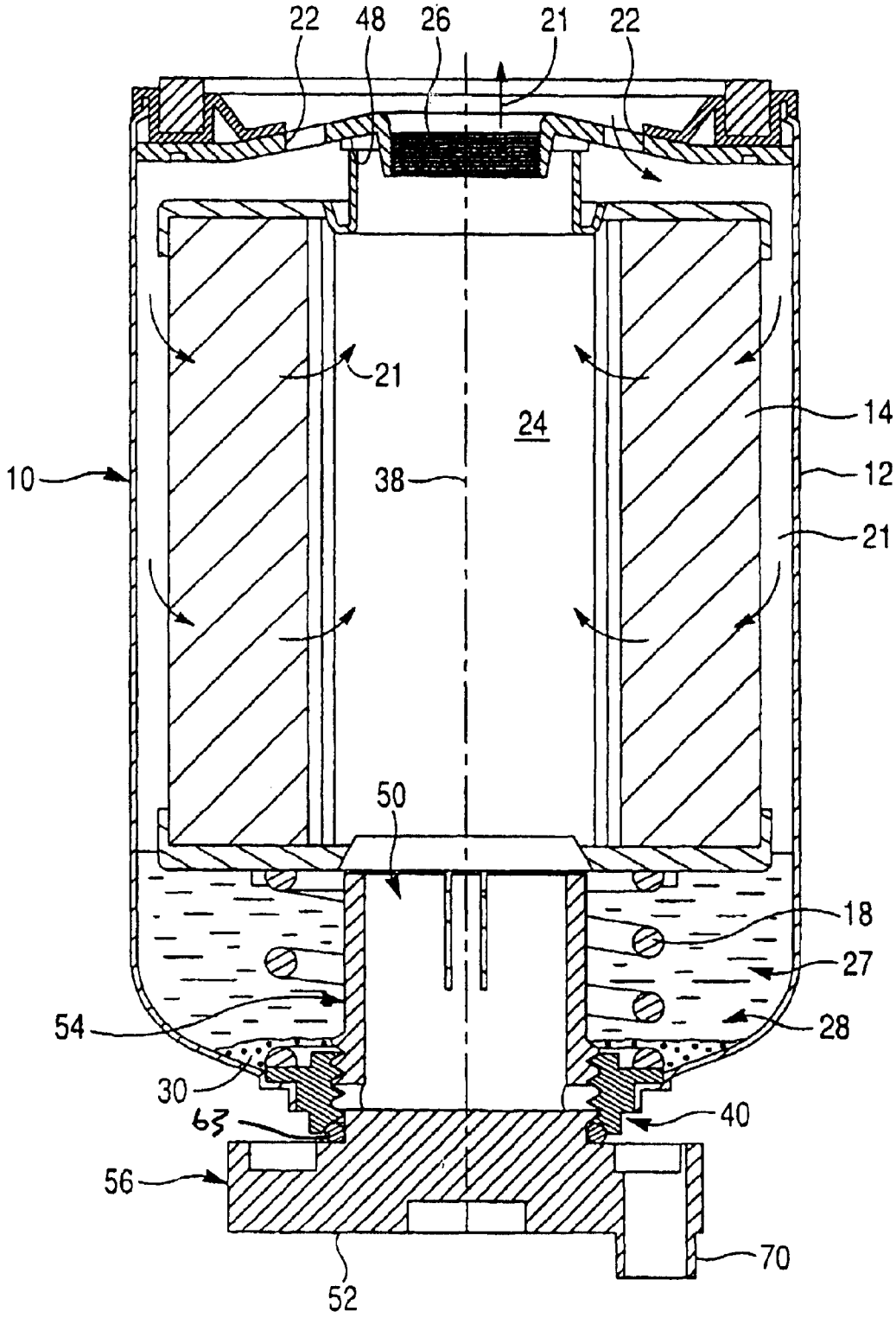
FIG. 2 is a cross-sectional view of a filter assembly in combination with a self-venting drain valve of the present invention in a closed position.
Figure 3:
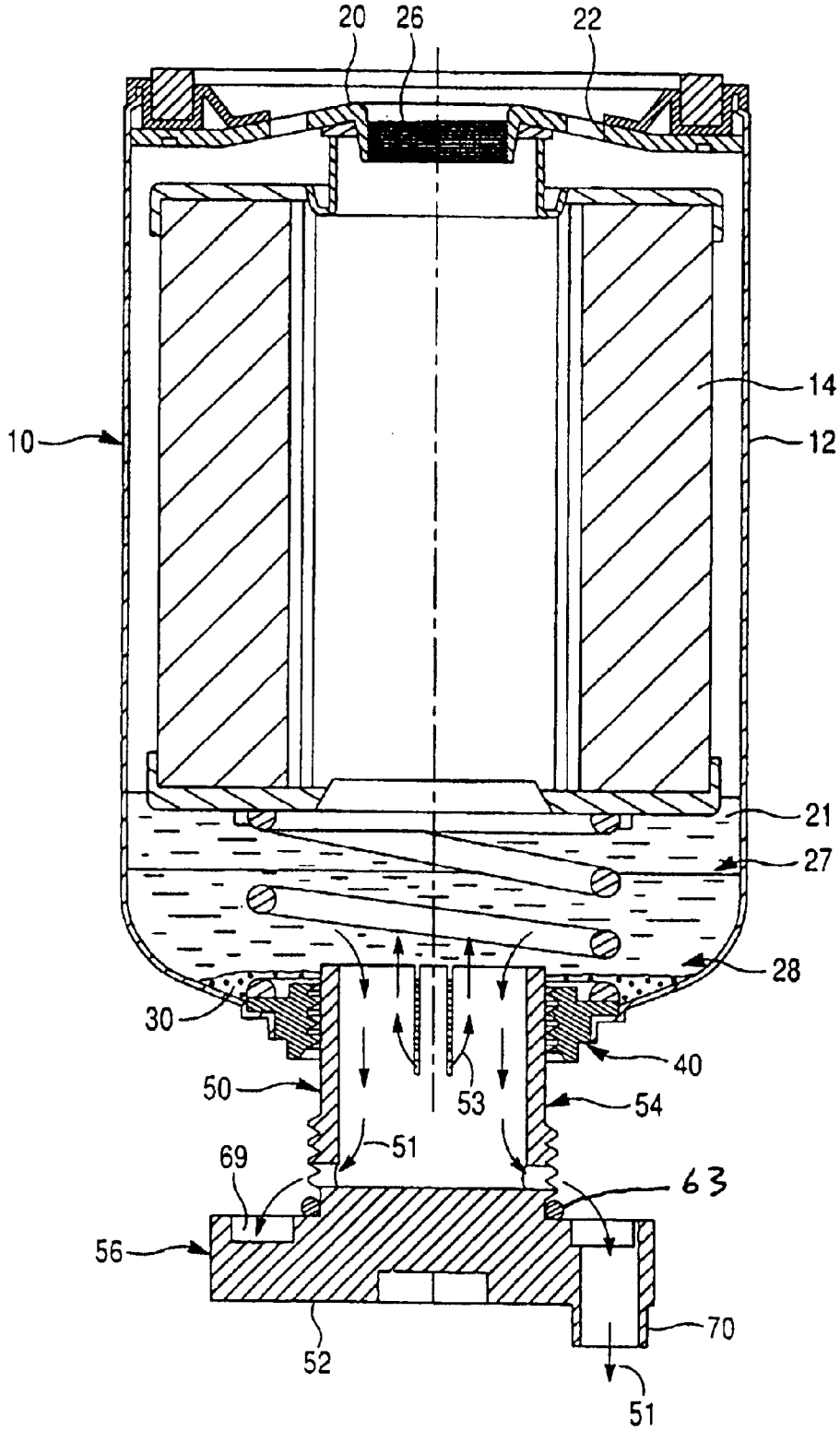
FIG. 3 is a cross-sectional view of the filter assembly in combination with the self-venting drain valve of the present invention in an open position.

Referring now mainly to FIGS. 1, 2 and 3, a filter assembly 10, to which the present invention can be applied, includes a housing 12 in which is disposed a filter element 14 that is biased by a coil spring 18 to seat against an end cap 20. In operation illustrated in FIG. 2, fuel to be filtered, represented by arrows 21, enters the housing 12 through a plurality of inlets 22 flows outside of the filter element 14 and through the filter element 14 into a hollow core 24. The fuel 21 then flows out of end plate 20 through threaded outlet 26 and is delivered to an engine such as a diesel or other internal combustion engine.

The filter element 14 separates water 27 from the fuel 21 as the fuel passes through the filter and the water pools in a space 28 at the bottom of the housing 12. Solid particulate contaminants 30, which have been filtered out by the filter element 14, also tend to fall out of the fuel 21 and water 27 and accumulate in the space 28 in the bottom of the housing 12.

As illustrated in details in FIG. 1, disposed in an end opening 36 that is coaxial with the axis 38 of the fuel filter assembly 10 is an internally threaded base 40 having an internal thread 42 defining a valve receiving bore. The base 40 has a shelf 44 against which one end of the coil spring 18 bears, the other end of the coil spring bearing against the filter element 14 to hold the filter element in engagement with the plate 20 at an area 48 surrounding the outlet 26.

During operation of the filter assembly 10 as illustrated in FIG. 3, the water 27 accumulates in the bottom portion of the housing 12 thereof and must be drained periodically to permit continued satisfactory operation of the filter assembly 10. In order to drain the water 27, which has accumulated in the space 28 of the housing 12, a self-venting drain valve 50 is threadedly received through the valve receiving bore 42 in the base 40. To perform this function, the valve 50 provides a drain path through which water collected in the bottom portion of the housing 12 may be drained out of the housing 12 while providing a passage for air to enter the housing 12 simultaneously to break the vacuum within the housing 12 and facilitate drainage. As is seen in FIG. 2, when the valve is closed, liquid in the housing 12 cannot drain from the filter assembly. As is seen in FIG. 3, when self-venting the drain valve 50 is open, water 27 flows in the path of arrow 51 through the drain valve 50 while air follows the path of arrow 53 into the housing 12 to prevent a partial vacuum from occurring therein which would interfere with the flow of water out of the drain valve 50. Since water is heavier than fuel 21, water 27 accumulates in the space 28 while fuel remains above the top surface of the water. The drain valve 50 is held in the FIG. 3 position until the person draining water 27 from the filter assembly 10 detects only fuel 21 draining therefrom. As will be explained more fully below, the drain valve 50 described herein provides a self-venting feature by a structure that is comparatively simple and inexpensive to manufacture as compared to the prior art designs.

Figure 4:
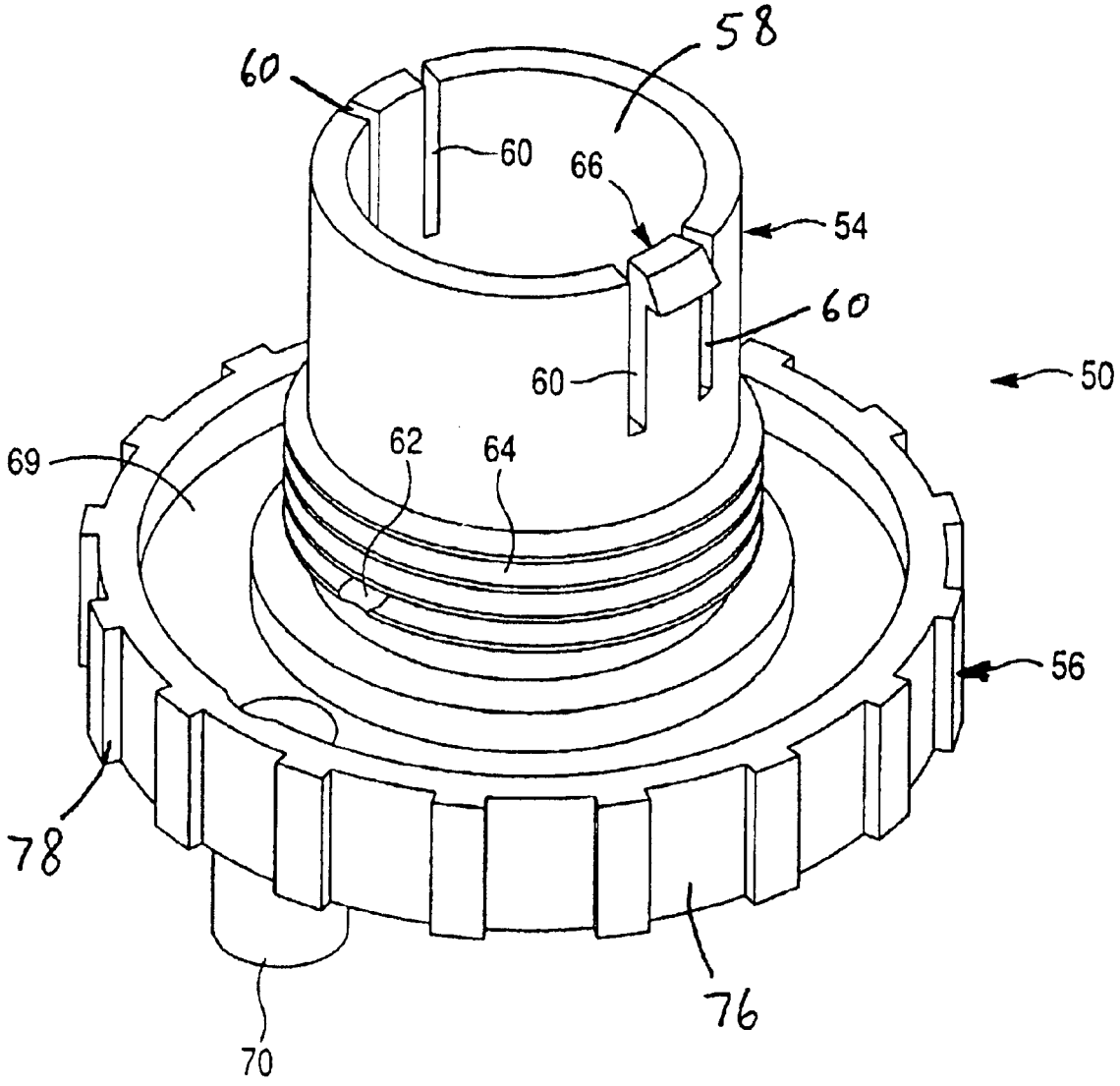
FIG. 4 is a perspective view of the self-venting drain valve of the present invention.
Figure 5:
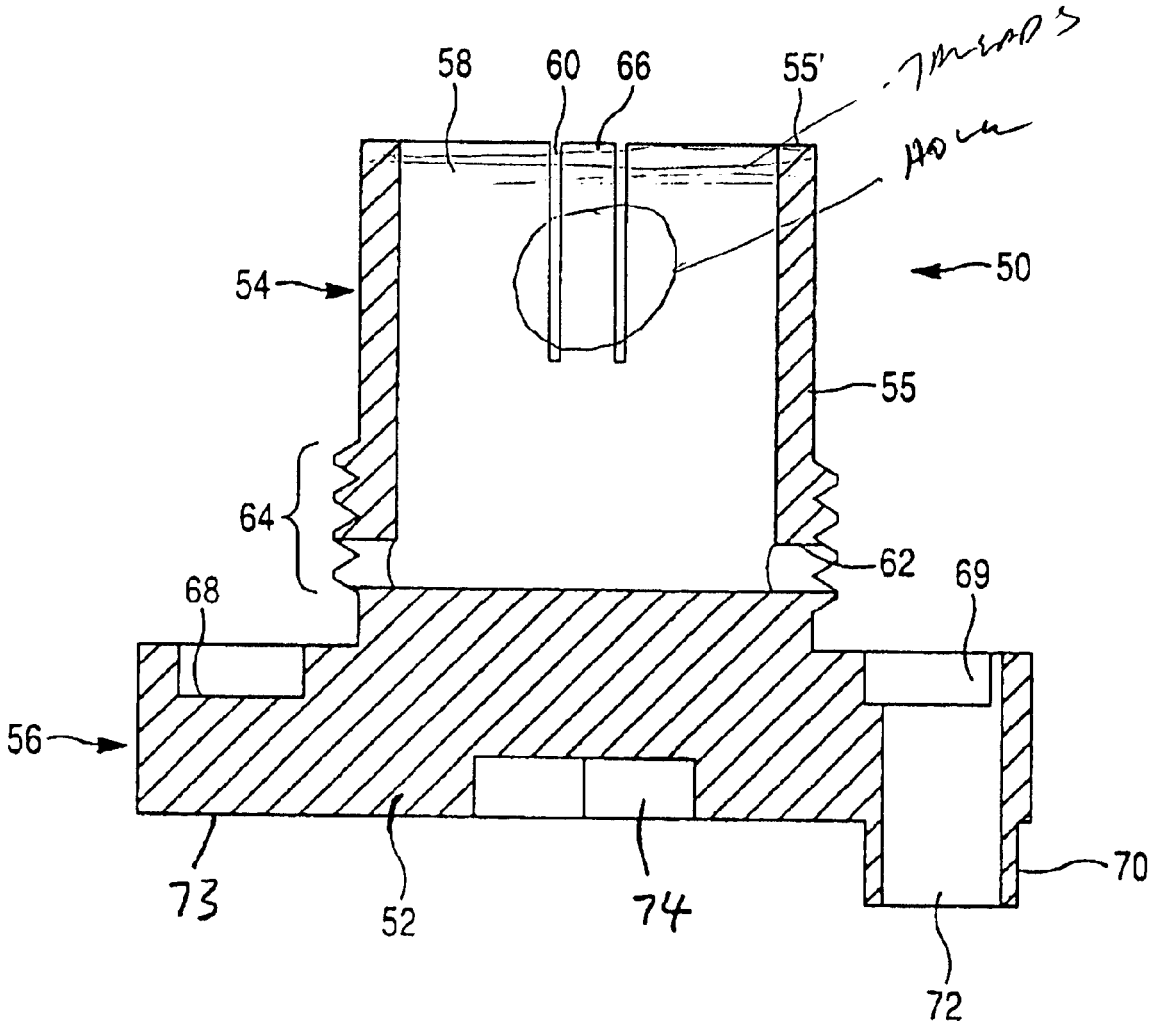
FIG. 5 is a cross-sectional view of the self-venting drain valve of the present invention.

The self-venting drain valve 50 in accordance with the preferred embodiment of the present invention, illustrated in detail in FIGS. 4 and 5, comprises a homogenously formed one-piece unitary valve body 52, preferably made of relatively lightweight and low-cost synthetic plastic materials that will not be corroded when exposed to the water flowing therethrough, such as rigid polyvinyl chloride (PVC). Preferably, the one-piece unitary valve body 52 is manufactured by injection molding. Alternatively, non-plastic corrosion-resistant materials, such as stainless steel or aluminum, may be used for manufacturing the one-piece valve body 52 of the drain valve 50. The one-piece unitary valve body 52 comprises a valve stem portion 54 and a valve knob portion 56 juxtaposed to a lower end of the valve stem portion 54.

The self-venting drain valve 50 is rotatably and slidably mounted to the filter housing 12 by the threaded base 40. In use, the drain valve 50 is movable between a closed position shown in FIG. 2, and an open position shown in FIG. 3, with the valve stem portion 54 extending through an opening in the threaded base 40 and the valve knob portion 56 positioned outside the filter housing 12.

The valve stem portion 54 is generally cylindrical in shape and includes a substantially tubular wall member 55 defining an internal passageway 58 through which liquid such as water may drain from the housing 12 of the filter assembly 10 and ambient air may enter the filter housing 12, and at least one drain hole 62 through which water is drained from the filter housing 12 and the internal passageway 58. Preferably, the valve stem portion 54 of the valve body 52 includes two opposite drain holes 62. The valve stem portion 54 further includes two opposite cantilever snap arms 66 adapted to retain the valve body 52 within the threaded base 40 in the open position. The snap arms 66 are preferably formed at the upper end of the wall member 55 integrally with the wall member 55. As shown in FIGS. 4 and 5, an axially extending space 60 is provided between the wall member 55 and the snap arms 66. The space 60 defines an air vent opening through which ambient air can enter the filter housing 12 via the internal passageway 58. The air vent openings 60 are formed through an upper end of the wall member 55 and are open to a top edge 55' thereof, while the drain holes 62 are formed through the lower portion of the wall member 55. It will be appreciated that any appropriate number of the snap arms, the air vent openings and drain holes, one, three, etc., is within the scope of the present invention.

Moreover, the lower portion of the wall member 55 is provided with external threads 64 which threadedly mate and are received within the internal threaded base 40 of the filter housing 12. The external threads 64 engage the internally threaded base 40 as shown in FIG. 2 when the drain valve 50 is in the closed position. When the drain valve 50 is in the open position, as shown in FIG. 3, the cantilever snap arms 66 formed at the upper end of the wall member 55 engage the threaded base 40 of the filter housing 12 to secure open the drain valve 50. Alternatively, the upper end of the wall member 55 may be provided with more than one external thread.

As illustrated in detail in FIG. 5, the entry of air into the housing 12 of the filter assembly 10 as allowed by the air vent openings 60 is substantially above the drain holes 62 in order to facilitate drainage of the filter housing 12 as proper siphoning of water has been found to be assisted. It has been also found that the drain holes 62 of the water outlet should open slightly before the air vent openings 60 of the air inlet opens to provide the proper flow sequencing. This function is achieved by terminating lower ends of the air vent openings 60 well above openings of the drain holes 62 into the wall member 55 of the valve stem portion 54.

The valve-knob portion 56 is disposed at the lower portion of the valve stem portion 54 to facilitate manual operation and to assist in draining water as will be discussed below. The valve knob portion 56 includes a substantially annular groove 68 facing the valve stem portion 54 and defining a drain reservoir 69, and a drain spout 70 forming a drain passageway 72 through which the water drains. The drain passageway 72 is open to the drain reservoir 69 at an upper end thereof, and to the ambient atmosphere at a lower end thereof. The drain spout 70 allows connection of a hose to drain fluid into a container without spillage. Additionally, the drain reservoir 69 allows to accumulate liquid being drained and also collects any liquid which may leak through a space between the valve stem portion 54 and the threaded base 40.

Figure 6:
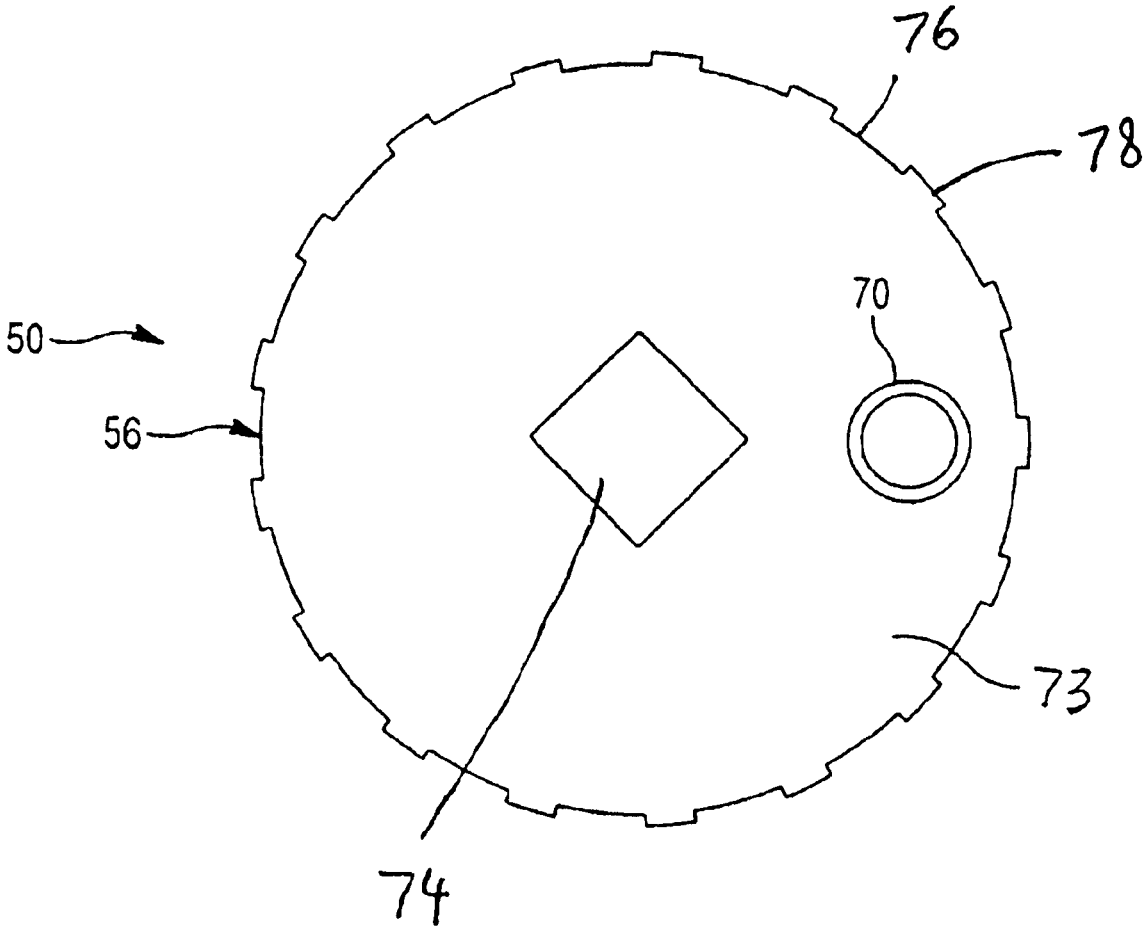
FIG. 6 is a bottom view of the self-venting drain valve of the present invention.
Figure 1:
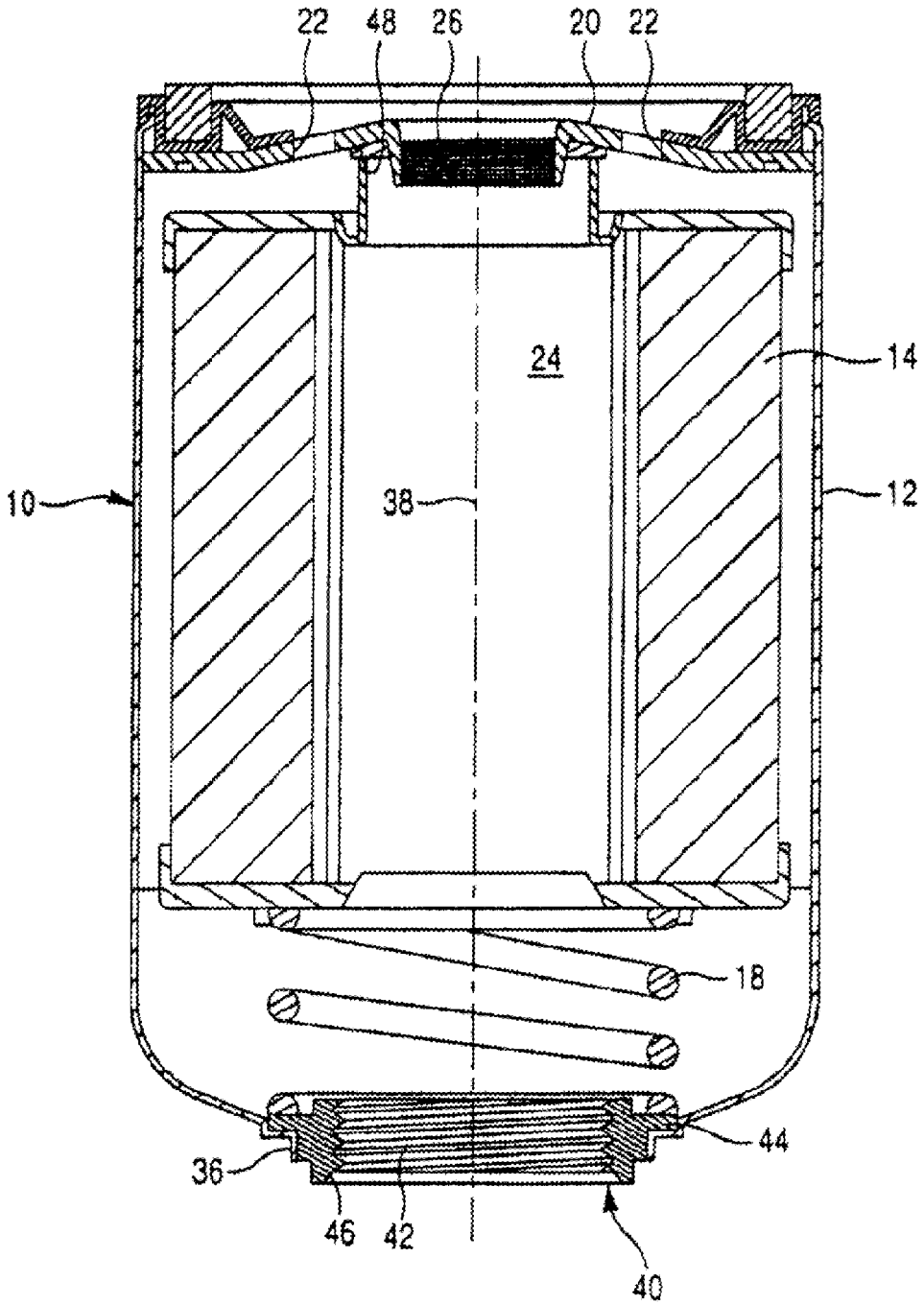
Figure 2:
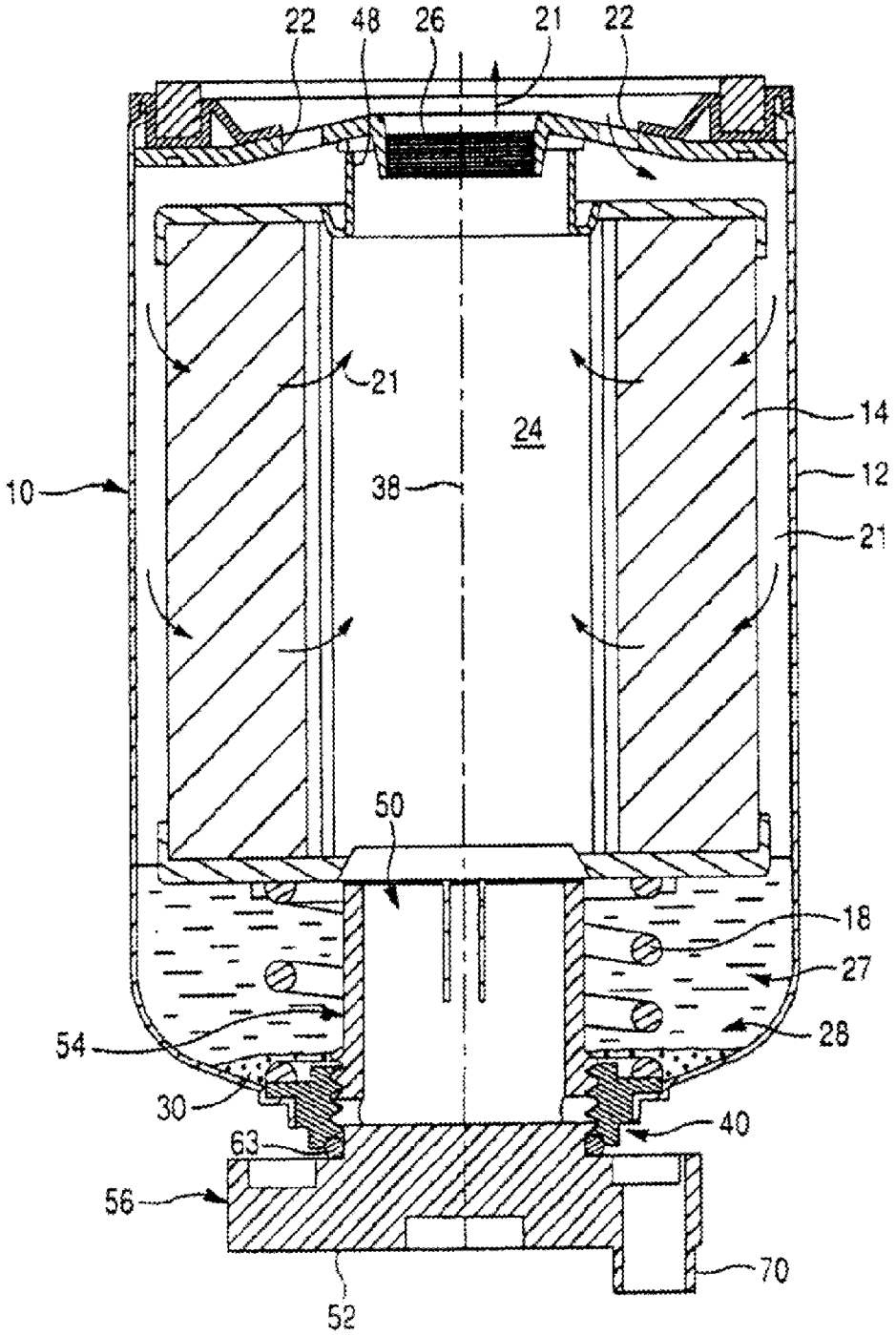
Figure 3:
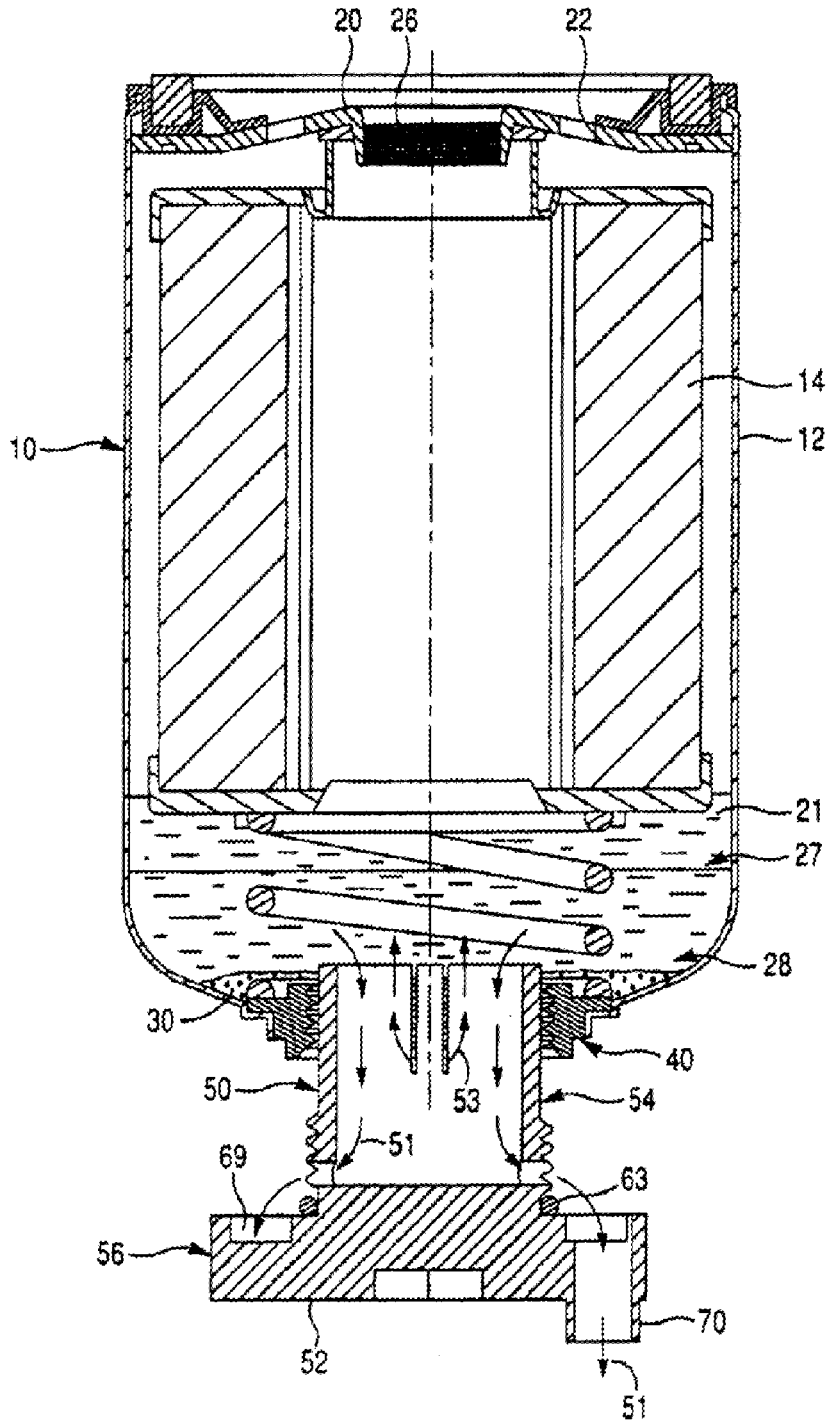
Figure 4:
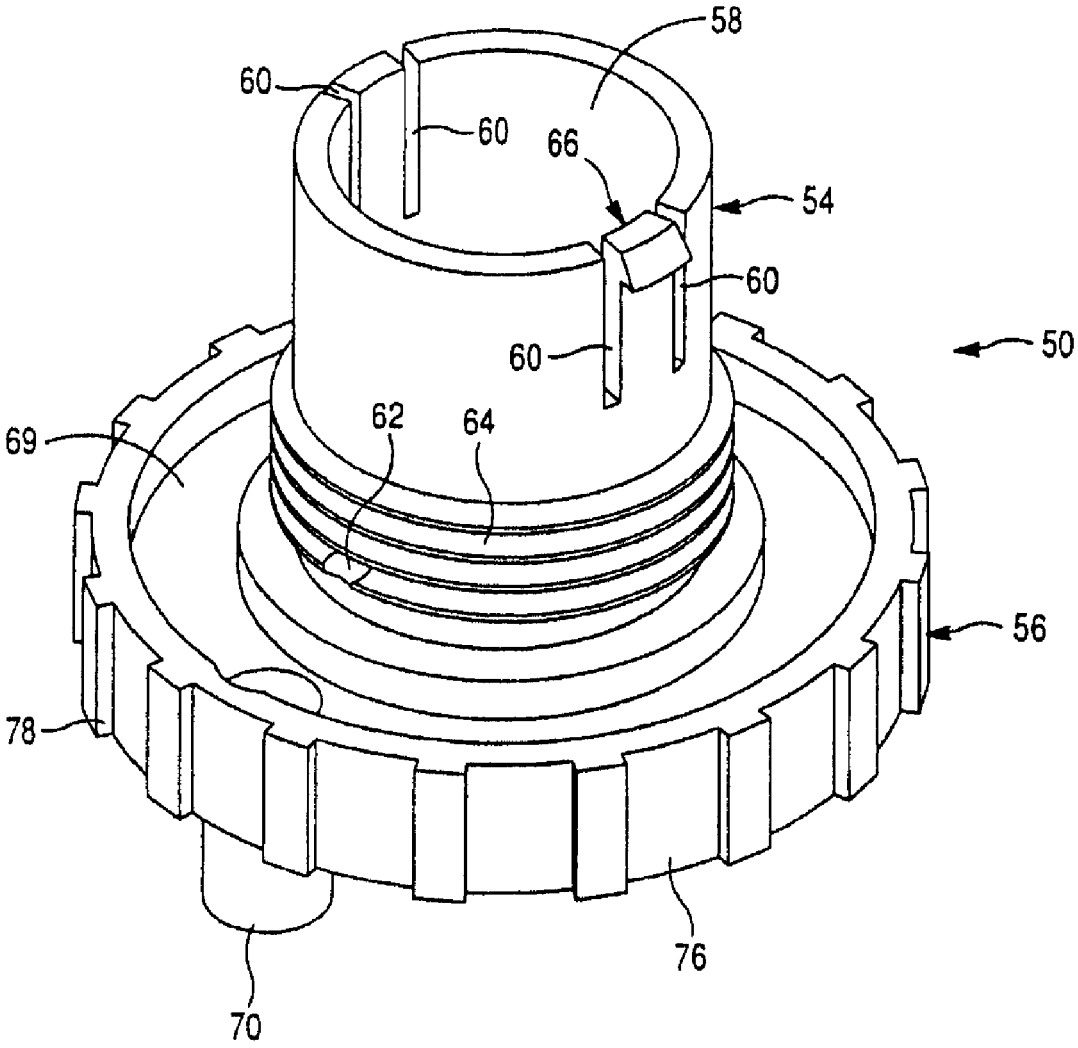
Figure 5:
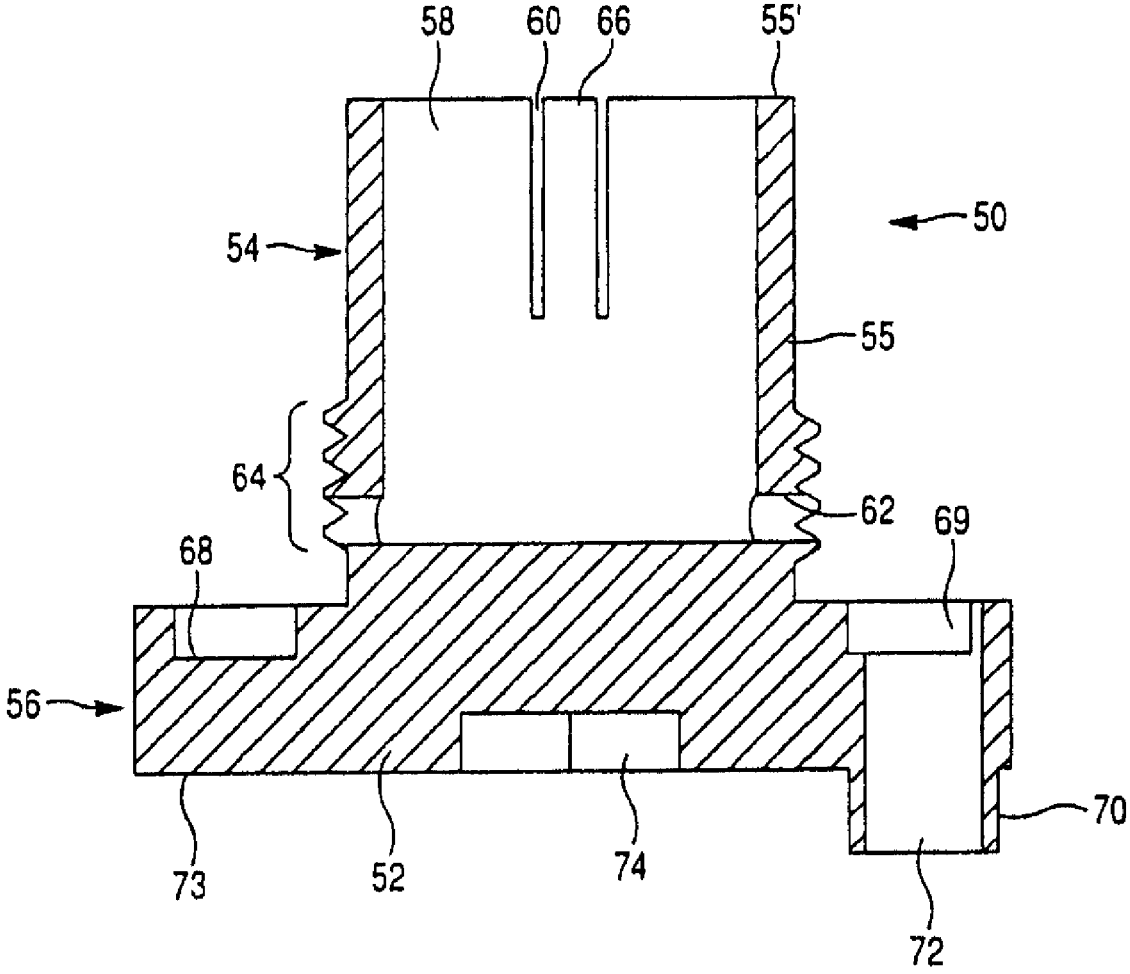
Figure 6:
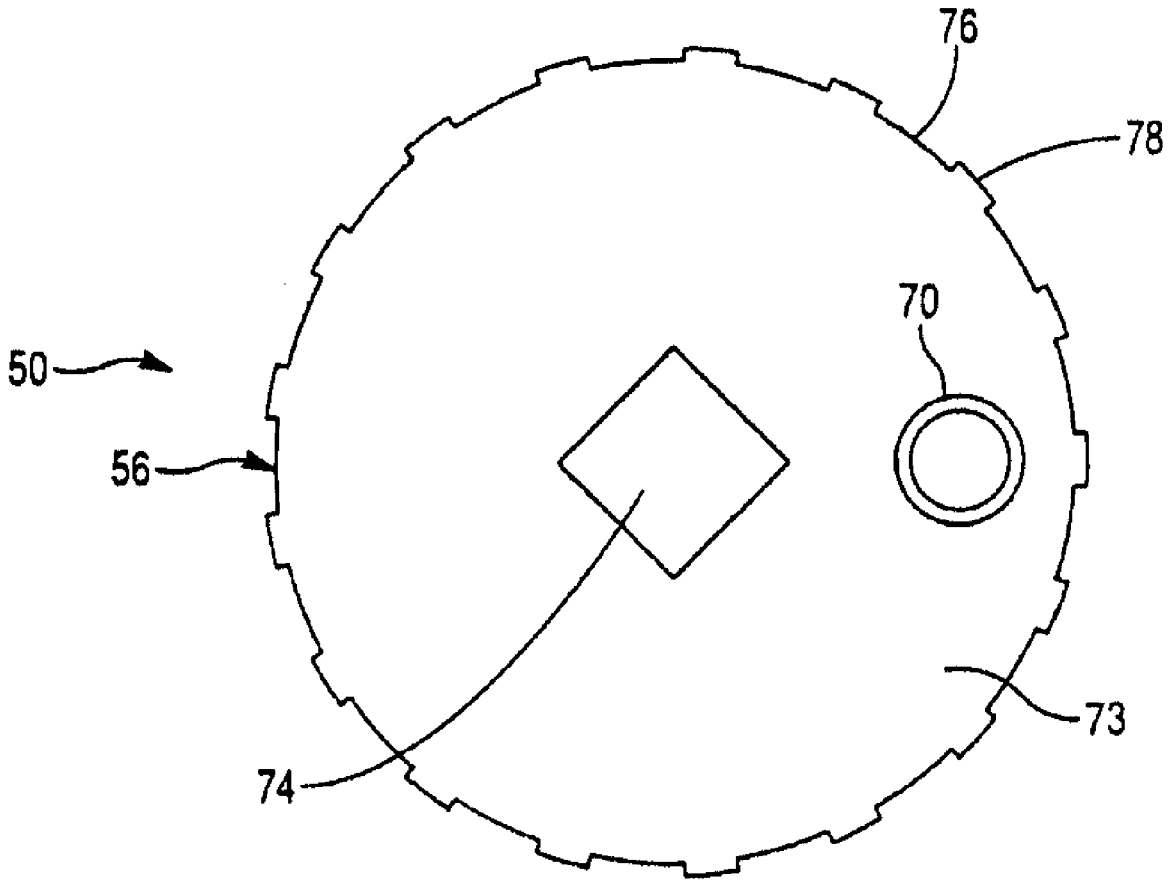

Moreover, the knob portion 56 includes a wrench socket 74 formed at a bottom surface 73 thereof and adapted to receive a wrench (not shown) for rotatably driving the valve body 52 between the closed position and the open position. As best illustrated in FIG. 6, the wrench socket 74 has generally square shape adapted to receive a standard ½ inch wrench (not shown). However, it will be appreciated by those skilled in the art that the wrench socket 74 may be of any appropriate shape, such as hexagonal.

Furthermore, a generally cylindrical outer peripheral surface 76 of the knob portion 56 is provided with axially oriented ribs 78 to facilitate manual gripping of the knob portion 56 of the valve body 52.

A gasket 63 disposed around the lower and of the valve stem portion 54 is trapped between a chamfered sealing surface 46 the threaded base 40 and the valve knob portion 56 when the drain valve 50 is in its closed position as shown in FIG. 2, in order to seal the internal passageway 58. The gasket 63 effectively seals both the air inlet and the water outlet when the drain valve 50 is in its closed position because the air vent openings 60 and the drain holes 62 are inside the filter housing 12. The gasket 63 is the only gasket required. Preferably, the gasket 63 is in the form of a conventional O-ring made of any appropriate elastic material, such as rubber.

To drain fluid from the filter housing 12, when valve assembly 50 is in the closed position as shown in FIG. 2, the valve assembly 50 is unscrewed so that the external threads 64 no longer mate with the internally threaded base 40. The unthreaded central portion of the valve stem portion 54 drops down through an aperture in the threaded base 40 of the filter housing 12, until the snap arms 66 engage the threaded base 40 to retain the valve assembly 50 in the open position, as shown in FIG. 3. At this point, liquid such as water in the filter housing 12 begins to siphon out of the filter housing 12 through the internal passageway 58 and the drain holes 62, while ambient air enters the filter housing 12 through the air vent openings 60 and the internal passageway 58. Water is siphoned through the passageway 58 because the drain holes 62 in the lower end of the valve stem portion 54 are disposed lower than the air vent openings 60 disposed at the upper end of the valve stem portion 54. After water exits the internal passage 58 through the drain holes 62, it fills the drain reservoir 69 in the valve knob portion 56, then drains through the drain passageway 72 in the drain spout 70.

Therefore, the one-piece self-venting drain valve in accordance with the present invention provides a simple self-venting liquid drain valve permitting liquid such as water to drain while gas such as ambient air enters the vessel being drained to facilitate drainage, even when the filter housing is subjected to a vacuum. The air enters the filter housing through the same fluid path in the valve assembly the draining water exits the filter housing. The self-venting drain valve of the present invention is relatively simple and inexpensive to manufacture because of the simplicity of its design that is a significant improvement over prior art valves.

The foregoing description of the preferred embodiments of the present invention has been presented for the purpose of illustration in accordance with the provision of the Patent Statutes. It is not intended to be exhaustive or to limit the invention to the precise forms disclosed. Obvious modifications or variations are possible in light of the above teachings. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. Thus, changes can be made in the above-described invention without departing from the intent and scope thereof. It is also intended that the scope of the present invention be defined by the claims appended thereto.

What is claimed is:

1. A self-venting drain valve for draining a contaminant liquid from a filter housing of a filter assembly, said filter housing having a valve receiving bore through which said liquid may drain and gas may simultaneously enter said filter housing, said valve comprising:

an integral valve body for selectively permitting and preventing draining said contaminant liquid from said filter housing through said bore;

said valve body having a substantially tubular stem portion positioned in said valve receiving bore within said filter housing, said tubular stem portion including a substantially tubular wall member defining in internal passageway and having at least one drain hole therethrough and at least one air vent opening therethrough both adapted to fluidly communicate said internal passageway to an ambient air;

said valve body being selectively positionable within said bore between a closed position wherein said at least one drain hole is sealed for preventing the liquid and air movement through said bore and an open position wherein said at least one drain hole is unsealed and said at least one air vent opening is partially open to said ambient air for allowing both liquid and air movement along said internal passageway within said tubular stem portion of said valve body.

2. The self-venting drain valve as defined in claim 1, wherein said integral valve body further includes a knob portion positioned outside said filter housing and juxtaposed to a lower end of said valve stem portion, said knob portion provided for manually manipulating said self-venting drain valve.

3. The self-venting drain valve as defined in claim 2, wherein said knob portion of said valve body is provided with a drain reservoir to assist the drainage of said liquid from said filter housing by accumulating said draining liquid exiting said at least one drain hole in said stem portion of said valve body to maintain a constant liquid head and controlled flow resistance.

4. The self-venting drain valve as defined in claim 3, wherein said drain reservoir is substantially annular in shape.

5. The self-venting drain valve as defined in claim 3, wherein said knob portion further including a drain spout adapted to assist the drainage of said liquid from said drain reservoir and allow a user to connect a hose to drain said liquid without spillage.

6. The self-venting drain valve as defined in claim 2, wherein an outer peripheral surface of said knob portion further including a wrench socket adapted to receive a wrench for rotatably driving said valve body between said closed position and said open position.

7. The self-venting drain valve as defined in claim 2, wherein said valve body including said tubular stem portion and said knob portion is homogenously formed as a one-piece unitary member.

8. The self-venting drain valve as defined in claim 7, wherein said valve body is made of a plastic material.

9. The self-venting drain valve as defined in claim 8, wherein said valve body is manufactured by an injection molding process.

10. The self-venting drain valve as defined in claim 1, wherein an upper portion of said at least one air vent opening remains within said filter housing while said valve body is in said open position.

11. The self-venting drain valve as defined in claim 1, wherein said at least one air vent opening is disposed above said at least one drain hole.

12. The self-venting drain valve as defined in claim 1, including two air vent openings formed through tubular wall member of said valve body and two opposite drain holes formed therethrough.

13. The self-venting drain valve as defined in claim 1, wherein a lower end of said tubular wall member comprises external threads that threadedly secure said valve body in said closed position.

14. The self-venting drain valve as defined in claim 13, wherein said valve receiving bore comprises internal threads adapted to engage said external threads on said lower ends of said wall member to hold said valve body in said closed positions.

15. The self-venting drain valve as defined in claim 1, wherein an upper end of said tubular wall member comprises at least one cantilever snap arm adapted to engage said valve receiving bore for retaining said valve body in said open position.

16. The self-venting drain valve as defined in claim 15, wherein said at least one air vent opening is defined by an axially extending space provided between said tubular wall member and said snap arm.

17. The self-venting drain valve as defined in claim 16, wherein said axially extending space defining said at least one air vent opening is open to a top edge of said wall member of said stem portion of said valve body.

18. The self-venting drain valve as defined in claim 1, further comprising a gasket positioned around said lower end of said valve stem portion to seal said internal passageway when said drain valve is in said closed position.

19. The self-venting drain valve as defined in claim 2, wherein a generally cylindrical outer peripheral surface of said knob portion is provided with axially oriented ribs to facilitate manual gripping of said knob portion of said valve body.

20. A self-venting drain valve for draining a contaminant liquid from a filter housing of a filter assembly, said filter housing having an internally threaded valve receiving bore through which said liquid may drain and gas may simultaneously enter said filter housing, said valve comprising:

an integral valve body for selectively permitting and preventing draining said contaminant liquid from said Filter housing through said bore;

said valve body having a tubular stem portion positioned in said valve receiving bore within said filter housing and a knob portion positioned outside said filter housing and juxtaposed to a lower end of said valve stem portion for manually manipulating said self-venting drain valve;

said tubular stem portion including a substantially tubular wall member defining an internal passageway and having two opposite drain holes therethrough formed in a lower end thereof, two opposite cantilever snap arms formed in an upper end of said tubular wall member and two opposite air vent openings therethrough defined by axially extending spaces provided between said tubular wall member and said snap arms, said drain holes and said air vent openings adapted to fluidly communicate said internal passageway to an ambient air, said air vent openings are disposed above said drain holes;

said knob portion of said valve body is provided with a substantially annular drain reservoir to assist the drainage of said liquid from said filter housing by accumulating said liquid exiting said drain holes in said stem portion of said valve body to maintain a constant liquid head and controlled flow resistance and a drain spout adapted to assist the drainage of said liquid from said drain reservoir and allow a user to connect a hose to drain said liquid without spillage;

said valve body being selectively positionable within said bore between a closed position wherein said drain holes are sealed for preventing said liquid and air movement through said bore and an open position wherein said drain holes are unsealed and said at least one air vent opening is partially open to said ambient air for allowing both liquid and air movement along said internal passageway within said tubular stem portion of said valve body;

a lower end of said tubular wall member comprises external threads adapted to engage said threaded valve receiving bore for securing said valve body in said closed position;

said cantilever step arms are adapted to engage said threaded valve receiving bore for retaining said valve body in said open position;

an outer peripheral surface of said knob portion further including a wrench socket adapted to receive a wrench for rotatably driving said valve body between said closed position and said open position;

wherein said valve body including said tubular stem portion and said knob portion is homogenously formed as a single piece unitary member of a plastic material by an injection molding process.

*21. A self-venting drain valve for draining a contaminant liquid from a filter housing of a filter assembly, said filter housing having a valve receiving bore through which said liquid may drain and gas may simultaneously enter said filter housing, said valve comprising:*

*an integral valve body for selectively permitting and preventing draining said contaminant liquid from said filter housing through said bore;*

*said valve body having a substantially tubular stem portion positioned in said valve receiving bore within said filter housing, said tubular stem portion including a substantially tubular wall member defining an internal passageway and having at least one drain hole therethrough and at least one air vent opening therethrough both adapted to fluidly communicate said internal passageway to an ambient air;*

*said valve body being selectively positionable within said bore between a closed position wherein said at least one drain hole is sealed for preventing the liquid and air movement through said bore and an open position wherein said at least one drain hole is unsealed and said at least one air vent opening is open to said ambient air for following both liquid and air movement along said internal passageway within said tubular stem portion of said valve body.*

* * * * *

UNITED STATES PATENT AND TRADEMARK OFFICE

CERTIFICATE OF CORRECTION

PATENT NO. : RE 40,051 E
APPLICATION NO. : 10/803197
DATED : February 12, 2008
INVENTOR(S) : Stamey, Jr. et al.

It is certified that error appears in the above-identified patent and that said Letters Patent is hereby corrected as shown below:

Delete Title page illustrating a figure(s), and substitute therefor, new Title page illustrating a figure(s). (attached)

Delete drawing sheets 1-6, and substitute therefor drawing sheets 1-6. (attached)

Signed and Sealed this

Tenth Day of June, 2008

JON W. DUDAS
*Director of the United States Patent and Trademark Office*

(19) United States
(12) Reissued Patent
Stamey, Jr. et al.

(10) Patent Number: US RE40,051 E
(45) Date of Reissued Patent: Feb. 12, 2008

(54) ONE-PIECE SELF-VENTING DRAIN VALVE

(75) Inventors: Willie L. Stamey, Jr., Kings Mountain, NC (US); Mark A. Roll, Bessemer City, NC (US)

(73) Assignee: Wix Filtration Corp LLC, Gastonia, NC (US)

(21) Appl. No.: 10/803,197

(22) Filed: Mar. 18, 2004

Related U.S. Patent Documents

Reissue of:
(64) Patent No.: 6,565,746
Issued: May 20, 2003
Appl. No.: 10/134,693
Filed: Apr. 30, 2002

(51) Int. Cl.
*F16K 24/00* (2006.01)
*B01D 35/00* (2006.01)

(52) U.S. Cl. ..... 210/248; 210/313; 210/541; 137/588

(58) Field of Classification Search ..... 210/248, 210/313, 541; 137/588
See application file for complete search history.

(56) References Cited

U.S. PATENT DOCUMENTS 4,724,074 A * 2/1988 Schaupp ..... 210/163
4,893,651 A * 1/1990 Herman et al. ..... 137/588
4,922,960 A * 5/1990 Oelschlaegel ..... 137/588
5,144,978 A * 9/1992 Brown et al. ..... 137/588
5,922,199 A * 7/1999 Hodgkins ..... 210/256
6,083,381 A * 7/2000 Connelly et al. ..... 210/86
6,237,628 B1 * 5/2001 Miller et al. ..... 137/588
6,248,236 B1 * 6/2001 Hodgkins ..... 210/232
6,258,269 B1 * 7/2001 Knight ..... 210/248
6,358,416 B1 * 3/2002 Miller et al. ..... 210/248

FOREIGN PATENT DOCUMENTS

EP 1090667 * 4/2001

* cited by examiner

*Primary Examiner*—Thomas M. Lithgow
(74) *Attorney, Agent, or Firm*—Honigman Miller Schwartz Cohn LLP

(57) ABSTRACT

A self-venting drain valve is rotatably and slidably mounted to a filter assembly through an internally threaded base. The drain valve comprises a homogenously formed one-piece unitary valve body including a tubular valve stem portion and a valve knob portion. The valve stem portion includes a wall member defining an internal passageway provided with axially extending air vent openings through which ambient air can enter a filter housing through the internal passageway, and drain holes through which water is drained from the filter housing and the internal passageway. The air vent openings are formed through an upper portion of the wall member and are open to a top edge thereof, while the drain holes are formed through the lower portion of the wall member. The liquid drains from the filter housing through the internal passageway and the drain holes, then exits into the valve knob portion.

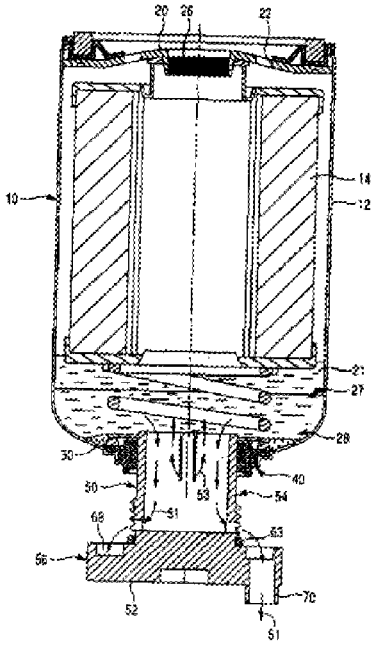

21 Claims, 6 Drawing Sheets